(12) United States Patent
Bate

(10) Patent No.: US 12,325,518 B2
(45) Date of Patent: Jun. 10, 2025

(54) MOVEABLE WING TIP ARRANGEMENTS

(71) Applicant: AIRBUS OPERATIONS LIMITED, Bristol (GB)

(72) Inventor: Christopher Alan Bate, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 103 days.

(21) Appl. No.: 18/323,788

(22) Filed: May 25, 2023

(65) Prior Publication Data

US 2023/0382513 A1 Nov. 30, 2023

(30) Foreign Application Priority Data

May 25, 2022 (GB) ...................................... 2207659

(51) Int. Cl.
*B64C 3/56* (2006.01)

(52) U.S. Cl.
CPC ...................................... *B64C 3/56* (2013.01)

(58) Field of Classification Search
CPC .......... B64C 3/56; B64C 3/546; B64C 23/072
See application file for complete search history.

(56) References Cited

U.S. PATENT DOCUMENTS

| | | | | |
|---|---|---|---|---|
| 2,166,564 | A * | 7/1939 | Atwood | .................... B64C 3/56 244/49 |
| 2,289,224 | A * | 7/1942 | Swanson | ................... B64C 3/56 244/49 |
| 2,719,682 | A * | 10/1955 | Handel | ..................... B64C 3/56 244/49 |
| 5,310,138 | A | 5/1994 | Fitzgibbon | |
| 5,381,986 | A | 1/1995 | Smith et al. | |
| 9,469,392 | B2 * | 10/2016 | Fox | ............................ B64C 3/56 |
| 9,889,920 | B2 * | 2/2018 | Harding | ................... B64C 3/56 |
| 2017/0152016 | A1 | 6/2017 | Napier et al. | |
| 2018/0001992 | A1 | 1/2018 | Kracke | |
| 2020/0269971 | A1 * | 8/2020 | Xi | ......................... B64C 23/072 |
| 2020/0398969 | A1 | 12/2020 | Lorenz | |

FOREIGN PATENT DOCUMENTS

| | | |
|---|---|---|
| CN | 113525668 | 10/2021 |
| GB | 635259 | 4/1950 |
| GB | 2535580 | 8/2016 |
| WO | 2019/034432 | 2/2019 |

OTHER PUBLICATIONS

Combined Search and Examination Report for Application No. GB2207659.0 mailed Nov. 28, 2022, 7 pages.
Extended European Search Report for Application No. 23175059.7, eight pages, dated Sep. 26, 2023.

* cited by examiner

*Primary Examiner* — Richard Green
(74) *Attorney, Agent, or Firm* — Nixon & Vanderhye P.C.

(57) ABSTRACT

A wing assembly for an aircraft is disclosed having an actuation assembly configured to move a wing tip device between a flight configuration and a ground configuration. The actuation assembly includes at least two linear actuation devices mounted within the wing assembly. A wing and a wing tip device for the wing assembly, and an aircraft comprising the wing assembly, wing or wing tip, are also disclosed.

15 Claims, 10 Drawing Sheets

MOVEABLE WING TIP ARRANGEMENTS

CROSS RELATED APPLICATION

This application claims priority to United Kingdom Patent Application GB 2207659.0, filed May 25, 2022, the entire contents of which is hereby incorporated by reference.

BACKGROUND OF THE INVENTION

The present invention relates to wing assemblies for aircraft having movable wing tip devices, wings and wing tip devices for such wing assemblies, and aircraft comprising such wing assemblies, wings and/or wing tip devices.

The maximum aircraft wing span for some aircraft, for example passenger aircraft, often is effectively limited by airport operating rules which govern various clearances required when manoeuvring around the airport, such as the span and/or ground clearance required for gate entry and safe taxiway usage.

In some suggested designs, aircraft are provided with wing tip devices which may be moved to reduce the span of the aircraft on the ground compared to when the aircraft is configured for flight. As wing spans continue to increase, the spanwise extent of wing tip devices relative to the inboard wing grows proportionally greater. However, there are technical challenges in providing a practical form of moving arrangement. Amongst the issues to be addressed is the problem of providing a reliable moving mechanism for accommodating the inboard and outboard movement of the wing tip device without impacting unduly on the design of the wing assembly.

SUMMARY OF THE INVENTION

The inventor has identified that, with the tendency for wing aspect ratios to increase and wing box thicknesses to decrease, further constraints to wing design are emerging regarding, for example, how and where to efficiently provide in the space available i) joints for reacting increasingly large flight loads transmitted between the movable wing tip device and the inboard wing of a wing assembly and/or ii) actuating mechanisms for driving the folding and unfolding of increasingly large and/or heavy wing tip device components. In designs for tapered wings, for example, as wing span increases the desired location along the wing for joining the wing tip device to the wing may be in a region of reduced cross sectional area and limited in space in which to accommodate and structurally support mechanisms for moving and securing in place a movable wing tip device and for distributing flight loads and other loads associated with such a device without unduly adversely affecting aerodynamic efficiency of the wing. Aspects of the present invention seek to mitigate or overcome at least some of the above-mentioned problems.

WO2019/034432 discloses a geared actuation unit, or geared rotary actuator (GRA) for folding upwards a wing tip portion relative to a fixed wing. The actuation unit is positioned in the wing on a main axis of rotation of the wing tip portion, intervening between two neighbouring hinge joints. As the size and weight of wing tip devices increase, the size and/or weight of such GRAs necessarily has to increase and therefore constrains wing design, especially where the desired wing tip fold location is at a location along the wing where the wingbox has relatively low depth and/or chord length. For example, such constraints may require actuator and/or structural joint components to be located externally of the wing, impairing aerodynamic efficiency. U.S. Pat. No. 5,381,986 discloses one linear wing tip fold actuator located centrally between the upper and lower covers within each wing and requiring a bulky fairing below the wing to accommodate various mechanisms. Use of geared rotary actuators or single linear actuators inside deep, or thick, wing boxes of short inboard wing sections of combat aircraft to which foldable wing portions are mounted is also known, for example as disclosed in GB635259A and used in the Blackburn Buccaneer combat aircraft from the 1950s.

According to a first aspect of the invention, there is provided a wing assembly for an aircraft, the wing assembly comprising a wing, a movable wing tip device at the tip of the wing, and an actuation assembly configured to move the wing tip device between:

i. a flight configuration for use during flight, in which the wing tip device projects from the wing for increasing the span of the aircraft, and ii. a ground configuration for use during ground-based manoeuvres, in which ground configuration the wing tip device is moved away from the flight configuration for reducing the span of the aircraft, the actuation assembly comprising at least two linear actuation devices mounted within the wing assembly to drivably connect the wing and the wing tip device for moving the wing tip device relative to the wing, the actuation devices being disposed adjacent, or closely adjacent, respective bottom edge portions of respective spars of the wing assembly; and the wing assembly further comprising a hinge arrangement disposed in a region of the upper covers of the wing assembly and extending between a front spar and a rear spar.

Such provision of a plurality of linear actuation devices for moving a wing tip device during ground operations facilitates, for a given wing tip device, a reduction in size and power of each of the actuation devices. This can facilitate the mitigation or avoidance of undesirable load concentrations in components of the wing assembly that support or are driven by the linear actuation devices, for example during movement of a wing tip in or out of the flight configuration, and/or facilitate the provision of smaller and/or lighter components. Furthermore, this can facilitate the mounting of actuation devices within the wing assembly, for example wholly within aerodynamic surfaces of the wing assembly, thereby facilitating the mitigation or elimination of undesirable aerodynamic drag that would otherwise be caused during flight by external protrusion of actuation devices, portions thereof, or fairings associated therewith, from aerodynamically significant surface portions of the wing assembly. Still further, this can reduce design constraints on the placement of actuation devices and other internal elements of the wing assembly within the aerodynamic surfaces of the wing assembly, for example permitting placement of actuation devices laterally outside of the wing box structure, and/or freeing up space around critical regions inside the wing box to enable structurally and mechanically effective design, including sizing and placement within the wing box of other elements such as hinges, upper and lower latches, latch locks and associated fixings.

Such provision of a plurality of linear actuation devices can also facilitate an increase in the aggregate power available to provide an ability to drive, for example, larger and/or heavier wing tip devices to reduce aerodynamic drag, by enabling an overall increase in the aggregate size and/or power of the actuation devices whilst accommodating such actuation devices within the wing assembly aerodynamic surface profile to maintain aerodynamic efficiency. The provision of a plurality of linear actuation devices also facilitates the provision of redundancy. For example, in some embodiments, at least two respective power and/or control systems, for example hydraulic and/or electrical systems, may be provided to independently control respective linear actuation devices, or groups of linear actuation devices. This facilitates redundancy of operation in the event that one of the devices fails, for example during movement between the ground and flight configurations, potentially mitigating or avoiding damage to the wing assembly, while maintaining an aerodynamically efficient surface profile of the wing assembly for flight.

Preferably, each actuation device has a longitudinal axis extending spanwise of the wing assembly, the longitudinal axes of the actuation devices being disposed in spaced relation in a widthwise direction of the wing assembly.

Preferably, the wing is connected by a hinge arrangement to the movable wing tip device, and the actuation assembly is configured to move the wing tip device relative to the wing about a hinge axis of the hinge arrangement, each actuation device having a longitudinal axis that extends transversely of the hinge axis, the longitudinal axes of the actuation devices being disposed in spaced relation in a direction of the hinge axis. Transverse in this context encompasses substantially perpendicular, and further includes axes that lie generally transverse to the hinge axis, for example up to 10°, or 20°, or 30° from a perpendicular direction, and longitudinal axes of the actuation devices that are not mutually parallel.

A reduction in the size and/or power of the actuation devices can facilitate a reduction in design constraints around the length of the vertical moment arm between the hinge axis and the longitudinal axes of the actuation devices. Such an arrangement facilitates favourable positioning of the actuation assembly in order to obtain mechanically advantageous application of force between the wing and the wing tip device, and therefore facilitates the use of still smaller and/or lighter actuation devices, potentially further enhancing at least some of the advantages described above.

In some embodiments, the actuation devices are disposed in a region of the lower covers of the wing assembly, for example adjacent, or closely adjacent, the lower covers. For example, the longitudinal axes of the actuation devices may be disposed as closely as the operational envelope of the devices allows to an inner surface of the lower covers, or skin, forming the bottom inner surface of the wing. This facilitates the provision of an increased vertical moment arm between a spanwise extending axis along which axial force is provided by the actuation devices and the hinge axis about which the wing tip device is driven by the actuation devices.

The disposition of the actuation devices in the region of, for example adjacent or closely adjacent, respective bottom edge portions of respective spanwise spars of the wing assembly, facilitates efficient and reliable support of the actuation devices.

The disposition of the hinge in a region of the upper covers of the wing assembly further facilitates the provision of an increased vertical moment arm between the spanwise extending axis along which axial force is provided by the actuation devices and the hinge axis.

The hinge may comprise a sequence of hinges. The sequence of hinges may be interspersed with upper latches. The sequence of hinges and latches may extend substantially uninterrupted between the front spar and the rear spar. The latches facilitate the interconnection of the wing and the wing tip device for transfer of flight loads therebetween in the flight configuration. In some embodiments, lower latches may be arranged in a widthwise or chordwise sequence not interrupted by any part of the actuation assembly, interconnecting the wing and the wing tip device in the flight configuration for transfer of flight loads therebetween.

In general, by freeing up space within the wing assembly, and in particular for example inside of the wing box, the provision of an increased number and/or size of hinge joints and/or latches is facilitated. This enables the transfer flight of loads at selected locations distributed widthwise or chordwise along the interface of the wing and the wing tip device, which locations can also be more closely and/or regularly spaced according to design requirements. This facilitates the mitigation of load peaking associated with concentrated groups of hinge and/or latch lugs, and enables increased flight loads to be accommodated by distributing the transfer of such loads across suitably sized and positioned hinge joints and latches, in a manner less constrained by components of the actuation assembly, and/or facilitates the provision of smaller and/or lighter hinge and/or latch components and fixings.

In some embodiments, at least one of the actuation devices comprises a base portion mounted within the wing, a driven portion movable relative to the base portion, and a connection portion, an outer end portion of the connection portion being pivotably connected to a pivot mount of the movable wing tip device.

In some embodiments, the base portion of at least one of the actuation devices is mounted in fixed relation to a spanwise spar of the wing assembly, so as to be structurally supported by said spar. This facilitates the provision of effective structural support to the actuation devices, for effectively distributing, through the load bearing structures of the wing assembly, loads transmitted through the actuation devices, while maintaining the advantages of an increased vertical moment arm. In some embodiments, the base portions are mounted to the wing, for example to the wing spars and optionally also to the lower cover overhangs of the wing. This arrangement is advantageous in that the actuation device does not have to lift the mass of its own base portion along with the wing tip device. In alternative embodiments, however, at least one of the actuation devices may have its base portion mounted in the wing tip device, the outer end portion of the connection portion being pivotably connected to a pivot mount of the wing.

Preferably, at least one said actuation device is mounted aft of a rear spar of the wing, and/or at least one said actuation device is mounted forward of a front spar of the wing. Mounting the actuation devices within the leading and trailing edge regions of the wing assembly, outside of the wing box region, facilitates the provision of relatively easy access to the actuation devices, for example through access openings forward and aft of the wing assembly covers, avoiding compromising the structural integrity of the wing or wing tip device by forming openings in the covers. For example, access to the actuation devices for maintenance and repair can be facilitated without the need for time-consuming operations to lift or remove the wing tip device using specialist Ground Support Equipment (GSE). Furthermore, the provisions of structural continuity between front and rear spars is facilitated, for example by enabling the provision of closing rib structure that is continuous between the spars and not greatly compromised by a large actuation device mounted within the wing box region. Still further, an increase in free space within the wing assembly facilitates efficient placement within the wing assembly of hydraulic and/or electrical and/or other system components required to pass from the wing into the wing tip device. Also, in some embodiments the provision of fuel tanks of appropriate size and shape within the wing box region is facilitated, where required.

Preferably, the connection portion is pivotably connected to the driven portion. This arrangement facilitates location of an actuation device low down within the wing assembly, providing a long vertical moment arm about the hinge axis during the initial phase of movement into the ground configuration and during the final phase of movement into the flight configuration, when the rotational load of the wing tip is greatest, while enabling the connection portion to pivot inwardly towards the wing to accommodate a wide range of rotation of the wing tip device.

Preferably, the longitudinal axes of the actuation devices are mutually parallel with one another, and substantially perpendicular with the hinge axis. This facilitates the provision of a simpler and more cost effective and/or reliable actuation arrangement. For example, control systems and mechanisms do not need to accommodate the necessary differences in travel and speed perpendicular to the hinge axis between driven portions of the actuation devices, or the non-alignment of axial forces from the actuation devices. In alternative embodiments, the longitudinal axes of the actuation devices may be non-parallel, for example aligned with non-parallel spars of the wing, and/or the longitudinal axis of at least one actuation device may be non-perpendicular to the hinge axis. In such embodiments, at least one actuation device may be provided, for example, with a spanwise extending additional axis of rotation for example between the driven portion and the connection portion, for accommodating the non-alignment.

The wing assembly preferably comprises a guide arrangement configured to guide movement of the connection portions of the actuation devices. Conveniently, each actuation device comprises a respective said guide arrangement. Alternatively, the guide arrangement in some embodiments is configured to guide the respective connection portions of a plurality of, for example adjacently mounted, actuation devices, for example for collective movement.

In some embodiments, a plurality of the actuation devices is mounted at widthwise or chordwise intervals between the front and rear wing spars.

At least some of the actuation devices preferably comprise lock mechanisms. A lock may be applied, for example, in the ground configuration as a safety measure, and/or in the flight configuration to assist in transmission of flight loads. Additionally or alternatively, the actuation devices may include a damping or braking feature, for example to mitigate the effects of failure of one or more actuation devices with the wing tip device raised in the ground configuration. The latch and/or lock mechanisms may be respectively interspersed between at least some of the actuation devices along the lower covers of the wing.

The linear actuation devices preferably comprise at least one selected from: a hydraulic actuator, an electric linear actuator. Preferably, at least two respective power and/or control systems are provided to independently operate the respective at least two linear actuation devices.

Advantageously, at least one recess or through opening may be defined in the lower covers of the wing assembly, so as to permit movement of at least one of the linear actuation devices below an upper surface of the lower covers during actuation.

Preferably, an upper region of the wing's wingbox is unimpeded by actuator devices, and/or all of the actuators for driving movement of the wing tip device are in a lower region of the wing's wingbox. For example, the actuator devices may have an operational footprint from the inner surface of the lower covers of within 50% of the depth of the wingbox, or within 40% of the depth of the wingbox.

According to a further aspect of the invention, a wing for the wing assembly according to the first aspect of the invention is configured to mount at least two linear actuation device base portions disposed in spaced relation widthwise of the wing adjacent or closely adjacent respective bottom edge portions of respective spars of the wing for pivotably driving relative movement between the wing tip device and the wing. Preferably, the wing is configured to mount the actuation devices respectively to a bottom region of a front spar and a bottom region of a rear spar of the wing.

According to a still further aspect of the invention, a wing tip device for the wing assembly according to the first aspect of the invention comprises at least two pivot mounts disposed in spaced relation widthwise of the wing tip device adjacent or closely adjacent respective bottom edge portions of respective spars of the wing tip device, each of the pivot mounts being configured to pivotably connect to a respective linear actuation device for driving relative movement between the wing tip device and the wing.

According to a yet further aspect of the invention, a wing assembly for a passenger or cargo aircraft, for example a large passenger or cargo aircraft, comprises a wing, a wing tip device pivotable about a hinge arrangement extending in a region of upper covers of the wing assembly, and a plurality of linear actuators in a region of the lower covers of the wing assembly for actuating the wing tip device, respective first portions of the actuators being mounted to respective spanwise extending structural beams of the wing or wing tip device for structural support, respective second portions of the actuators being pivotably connected to respective pivot mounts on the other of the wing tip device or wing, so as to provide a dual actuation movement as the second actuator portions are driven to extend and retract from the first actuator portions.

The wing assembly may comprise respective connecting arms pivotably interconnecting the respective second portions of the actuators to respective pivot mounts of the wing tip device or wing.

According to another aspect of the invention, an aircraft comprises a wing assembly, wing or wing tip device according to any of the above described aspects of the invention.

It will be apparent from the above that at least some embodiments facilitate the provision of longer movable wing tip devices and/or longer span wing assemblies, especially when used with high aspect ratio wings with low thickness to chord ratios and shallow wing boxes, and/or of wing assemblies with reduced overall drag, and/or of aircraft with increased fuel efficiency, reduced emissions and/or reduced operating costs. Such arrangements may facilitate the mitigation or overcoming of potential problems in providing a movable wing tip device while providing suitable structures for transferring flight loads across the interface of the wing and wing tip device. Such arrangements may also facilitate the use of smaller and/or lighter actuators, and favourable positioning of the actuation assembly in order to obtain mechanical advantage when applying force to the wing tip device, facilitating still further actuator size and/or weight reduction.

The wing tip device may be a wing tip extension, for example a generally planar tip extension. In other embodiments, the wing tip device may comprise, or consist of, a non-planar device, such as a winglet. The wing tip device may comprise a further wing section having a further movable wing tip device at its distal end. The ordinarily skilled person will be aware of other devices suitable for movably placing at the wing tip. The wing tip device may include, for example, trailing edge moveable devices for control (ailerons) or leading edge devices for stall protection, such as slats or droop nose devices.

In the flight configuration the trailing edge of the wing tip device may be a continuation of the trailing edge of the wing. The leading edge of the wing tip device may be a continuation of the leading edge of the wing, such that there is a smooth transition from the wing to the wing tip device. It will be appreciated that there may be a smooth transition, even where there are changes in sweep or twist at the wing/wing tip device junction. However, there are preferably no discontinuities at the junction between the wing and wing tip device. The junction between the wing and wing tip device may extend transversely, or substantially perpendicular to a spanwise direction of the wing, which may as in some embodiments described below facilitate efficient arrangement of mechanisms and/or control systems for moving the wing tip device. Alternatively, the junction between the wing and wing tip device may extend in another direction, for example along a chordwise direction of the wing assembly, which in some embodiments may be generally aerodynamically favourable and easier to seal against leakage of airflow between top and bottom surfaces of the wing assembly in flight. At least at the root of the wing tip device, and preferably along the length of the wing tip device, the upper and lower surfaces of the wing tip device may be continuations of the upper and lower surfaces of the wing.

The span ratio of the wing relative to the wing tip device may be such that the wing comprises at least 60%, 70%, 80%, 90%, or more, of the overall span of the wing assembly. The wing may comprise a wing root fixedly mounted to an aircraft body. In alternative embodiments, the wing may be movably connected to an inboard further wing portion, the latter fixedly mounted to the aircraft body, providing a wing assembly with more than two relatively movable sections.

When the wing tip device is in the ground configuration, the aircraft incorporating the wing, may be unsuitable for flight. For example, the wing tip device may be aerodynamically and/or structurally unsuitable for flight in the ground configuration. The aircraft is preferably configured such that, during flight, the wing tip device is not moveable to the ground configuration. The aircraft may comprise a sensor for sensing when the aircraft is in flight. When the sensor senses that the aircraft is in flight, a control system is preferably arranged to disable the possibility of moving the wing tip device to the ground configuration. In the ground configuration the wing tip device may be held in place. For example the wing tip device may be latched or locked in place to prevent movement back towards the flight configuration.

The actuation devices may comprise actuators that take any of a wide variety of forms and may for example be any suitable kind of gas, hydraulic or electric drive. Many alternative implementations of the actuation assembly will be apparent to the ordinarily skilled person.

The aircraft is preferably a passenger aircraft or cargo aircraft. The passenger aircraft preferably comprises a passenger cabin comprising a plurality of rows and columns of seat units for accommodating a multiplicity of passengers. The aircraft may have a capacity of at least 20, more preferably at least 50 passengers, and more preferably more than 50 passengers. The aircraft is preferably a powered aircraft. The aircraft preferably comprises an engine for propelling the aircraft. The aircraft may comprise wing-mounted, and preferably underwing, engines.

It will of course be appreciated that features described in relation to one aspect of the present invention may be incorporated into other aspects of the present invention.

DESCRIPTION OF THE DRAWINGS

Embodiments of the present invention will now be described by way of example only with reference to the accompanying schematic drawings of which.

DETAILED DESCRIPTION

Figure 1:
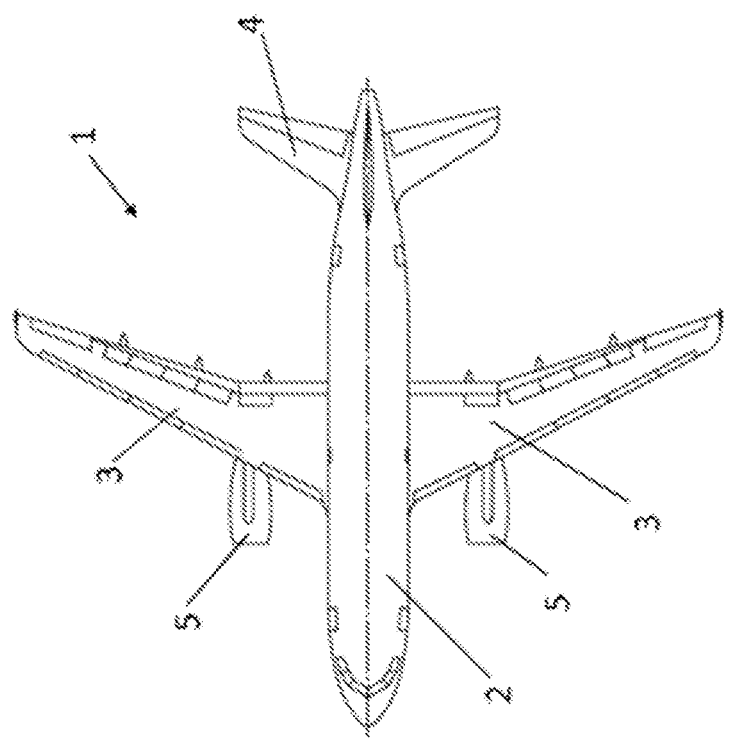
FIG. 1 is a top view of a passenger aircraft to which embodiments of the invention may be applied.

FIG. 1 shows a passenger aircraft 1 having a fuselage 2, wing assemblies 3, a tailplane 4 and engines 5. The aircraft shown in FIG. 1 is a simply one example of an aircraft to which embodiments of a wing assembly, wing or wing tip device as described below may be applied.

Referring now to FIGS. 2 to 8 and 10, a wing assembly 200 is provided that is suitable for use as the right hand wing of an aircraft such as the aircraft 1 shown in FIG. 1. The wing assembly 200 comprises a wing 210 connected by a hinge or hinge arrangement (not shown in FIG. 2 to 8 or 10) to a movable wing tip device 300 at the outboard end, or tip, of the wing 210. The wing assembly 200 further comprises an actuation assembly comprising first and second linear actuation devices 540, 530 mounted within the wing assembly 200. The actuation assembly 530, 540 drivably connects the wing 210 and the wing tip device 300 for moving the wing tip device 300 relative to the wing 210 about an axis H-H of the hinge arrangement.

Figure 2:
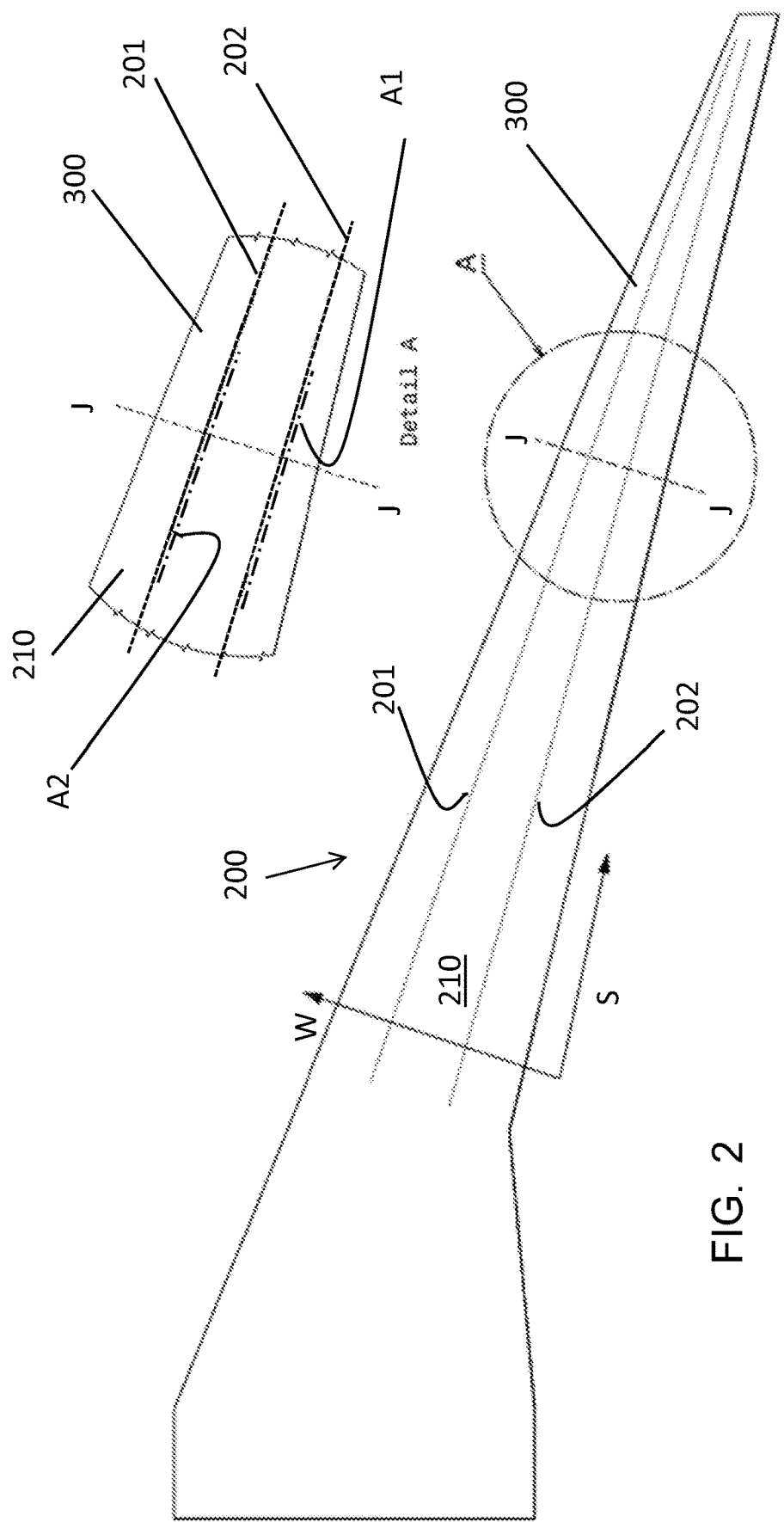
FIG. 2 shows a plan view of a right hand wing assembly having a wing and a movable wing tip device.
Figure 3:
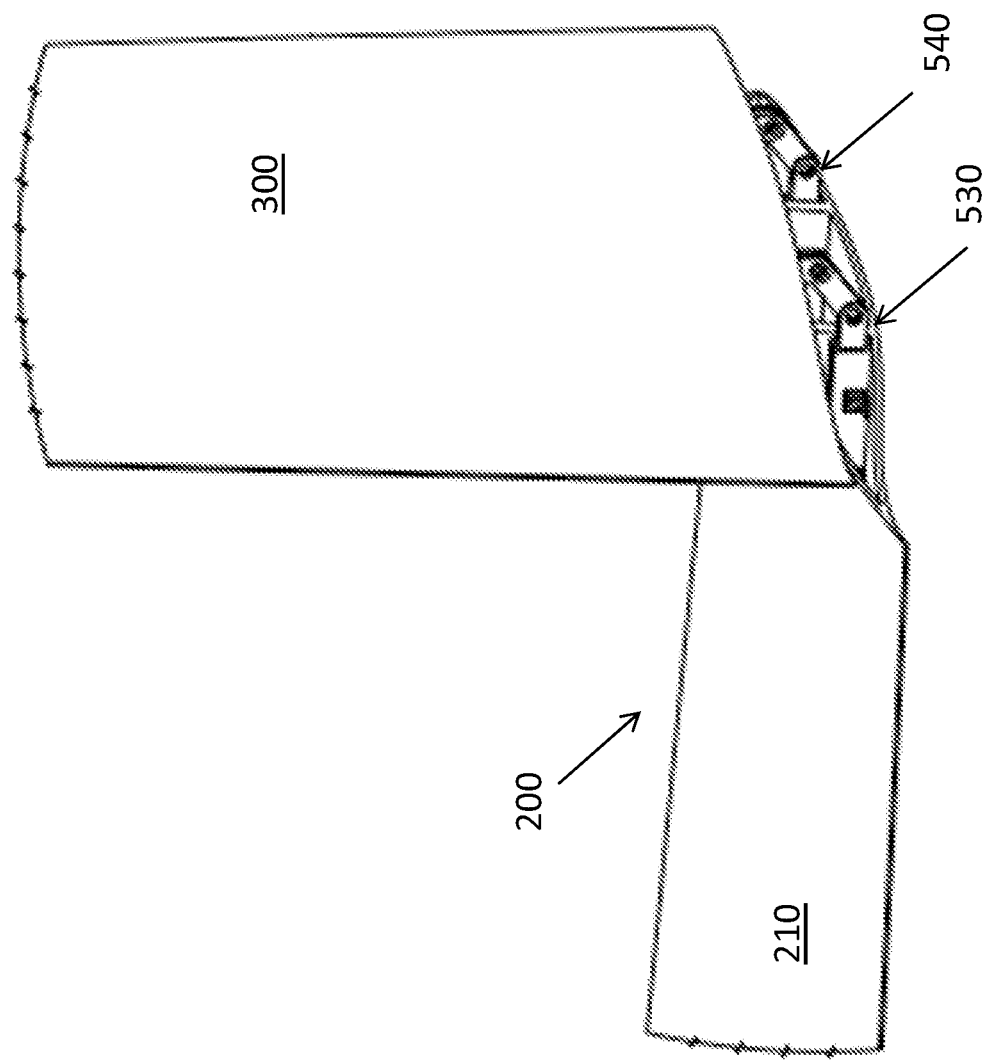
FIG. 3 is a perspective view from the rear outboard end showing parts of the wing assembly in a ground configuration.

The actuation assembly 530, 540 is configured to move the wing tip device 300 about the hinge axis H-H between a flight configuration as shown in FIG. 2, for use during flight, in which the wing tip device 300 projects from the wing 210 for increasing the span of the aircraft, and a ground configuration as shown in FIG. 3, for use during ground-based manoeuvres, in which the wing tip device 300 is moved away from the flight configuration for reducing the span of the aircraft.

In the flight configuration the trailing edge of the wing tip device 300 may be a continuation of the trailing edge of the wing 210. The leading edge of the wing tip device 300 may be a continuation of the leading edge of the wing 210, such that there is a smooth transition from the wing 210 to the wing tip device 300. It will be appreciated that there may be a smooth transition, even where there are changes in sweep or twist at the wing/wing tip device junction J-J. At least at the root of the wing tip device, and preferably along the length of the wing tip device, the upper and lower surfaces of the wing tip device may be continuations of the upper and lower surfaces of the wing. However, there are preferably no discontinuities at the junction, or interface, J-J between the wing 210 and wing tip device 300. The junction J-J between the wing 210 and wing tip device 300 extends in a widthwise direction, for example substantially perpendicular to a spanwise direction of the wing 210. At least in some embodiments, this may facilitate efficient and simpler arrangement of mechanisms and/or control systems for moving the wing tip device 300. The hinge axis H-H also extends widthwise of the wing assembly 200, in a region of the junction J-J.

Spanwise as used herein relates to a movement or direction, shown generally using arrow S in FIG. 2, having a major component extending along a longitudinal axis of the tapered and swept portion of the wing assembly 200 between root and tip, for example generally in a direction of the spar axes 201, 202. Widthwise as used herein relates to a movement or direction generally transverse to the spanwise direction, across the wing assembly 200, and is indicated generally by arrow W in FIG. 2, and encompasses chordwise movement or direction. Chordwise as used herein relates to a movement or direction generally aligned with a chord of the wing assembly, and includes a direction of expected airflow over the wing assembly during flight between leading and trailing edges of the wing assembly.

The wing 210 comprises first and second spars 220, 230 that provide structural support for various elements of the wing 210, including upper covers 211 and lower covers 212. The upper and lower covers 211, 212 extend widthwise of the wing 210, at least between the wing spars 220, 230, forming a wing box to provide core structural support along the wing 210. Aerodynamic surfaces of the wing 210 extend forward of the first spar 220 to form a D-nose leading edge portion of the wing 210 and rearward of the second spar 230 to form a trailing edge portion of the wing 210. Such aerodynamic surfaces may be at least partially provided by extension of the covers 211, 212.

The wing tip device 300 comprises first and second beams 320, 330, or spars, that provide structural support for the wing tip device 300, including for upper covers 311 and lower covers 312 of the wing tip device 300. The upper and lower covers 311, 312 extend widthwise of the wing tip device 300 between the beams 320, 330, to provide core structural support along the wing tip device 300. Aerodynamic surfaces of the wing tip device 300 extend forward of the first beam 320 to form a D-nose leading edge portion of the wing tip device 300 and rearward of the second beam 330 to form a trailing edge portion of the wing tip device 300. Such aerodynamic surfaces may be at least partially provided by extension of the covers 311, 312 of the wing tip device.

The wing tip device 300 may be a wing tip extension, for example a generally planar tip extension as shown in the figures. In other embodiments, the wing tip device 300 may comprise, or consist of, a non-planar device, such as a winglet. The wing tip device 300 may comprise a further wing section having a further movable wing tip device at its distal end. The ordinarily skilled person will be aware of other devices suitable for movably placing at the wing tip. The wing tip device may include, for example, trailing edge moveable devices for control (ailerons) or leading edge devices for stall protection, such as slats or droop nose devices.

Figure 10:
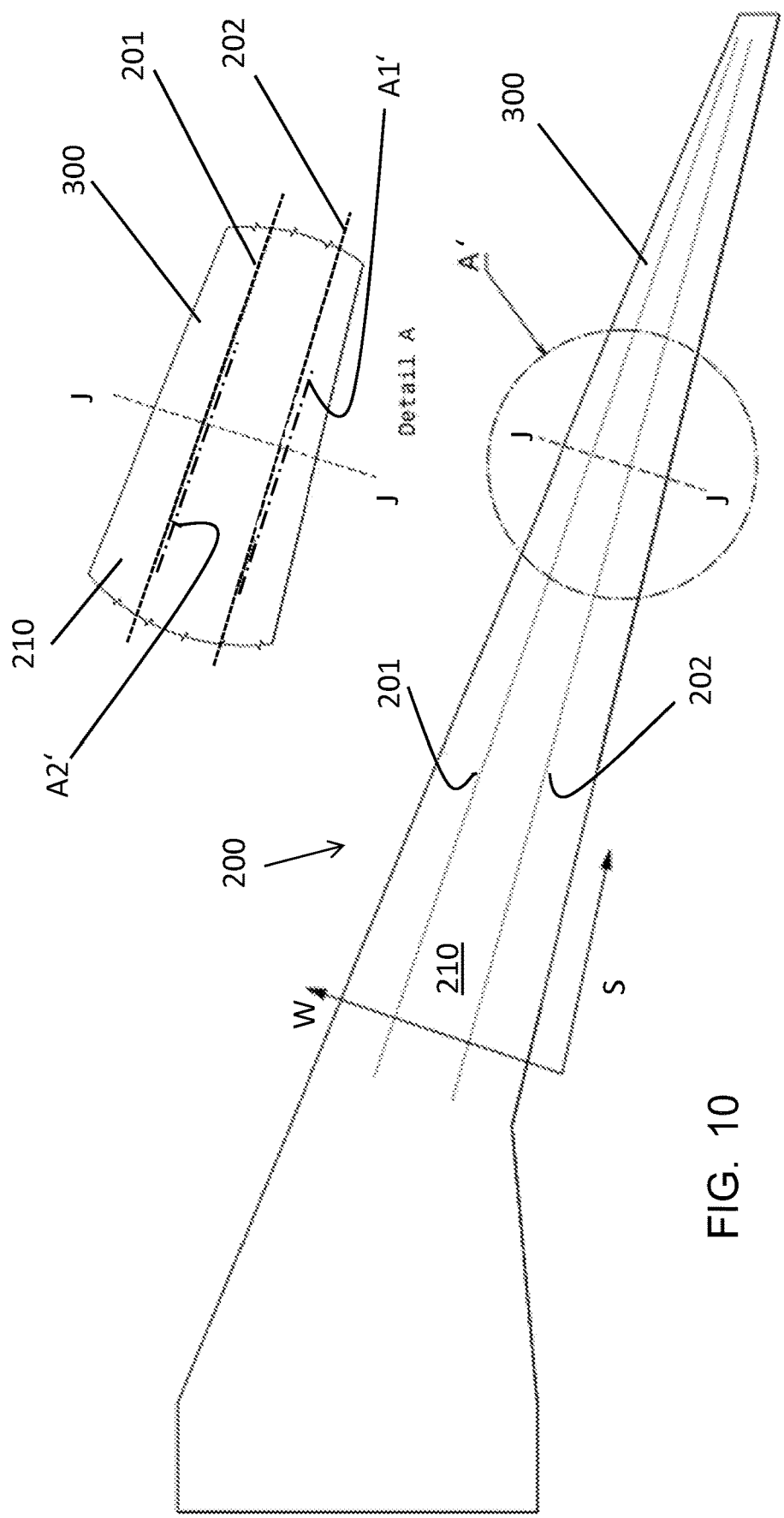
FIG. 10 shows a plan view of the wing assembly having an alternative actuation device arrangement.

The first spar 220 of the wing 210 is aligned along a first spanwise extending axis 201 with the first beam 320 of the wing tip device 300. The second spar 230 of the wing 210 is aligned along a second spanwise extending axis 202 with the second beam 330 of the wing tip device 300. The first and second spars 220, 230, and the first and second wing tip device beams 320, 330, and thus the first and second axes 201, 202, tend to converge together in a spanwise outward direction, as best shown in FIGS. 2 and 10, to provide structural support for the tapered swept wing structure of the wing assembly 200.

Each of the first and second linear actuation devices 540, 530 has a respective longitudinal axis A1, A2 that extends along a spanwise direction of the wing assembly 200. The first and second longitudinal axes A1 and A2 are spaced apart widthwise of the wing assembly 200, along a direction of the hinge axis H-H.

Figure 4:
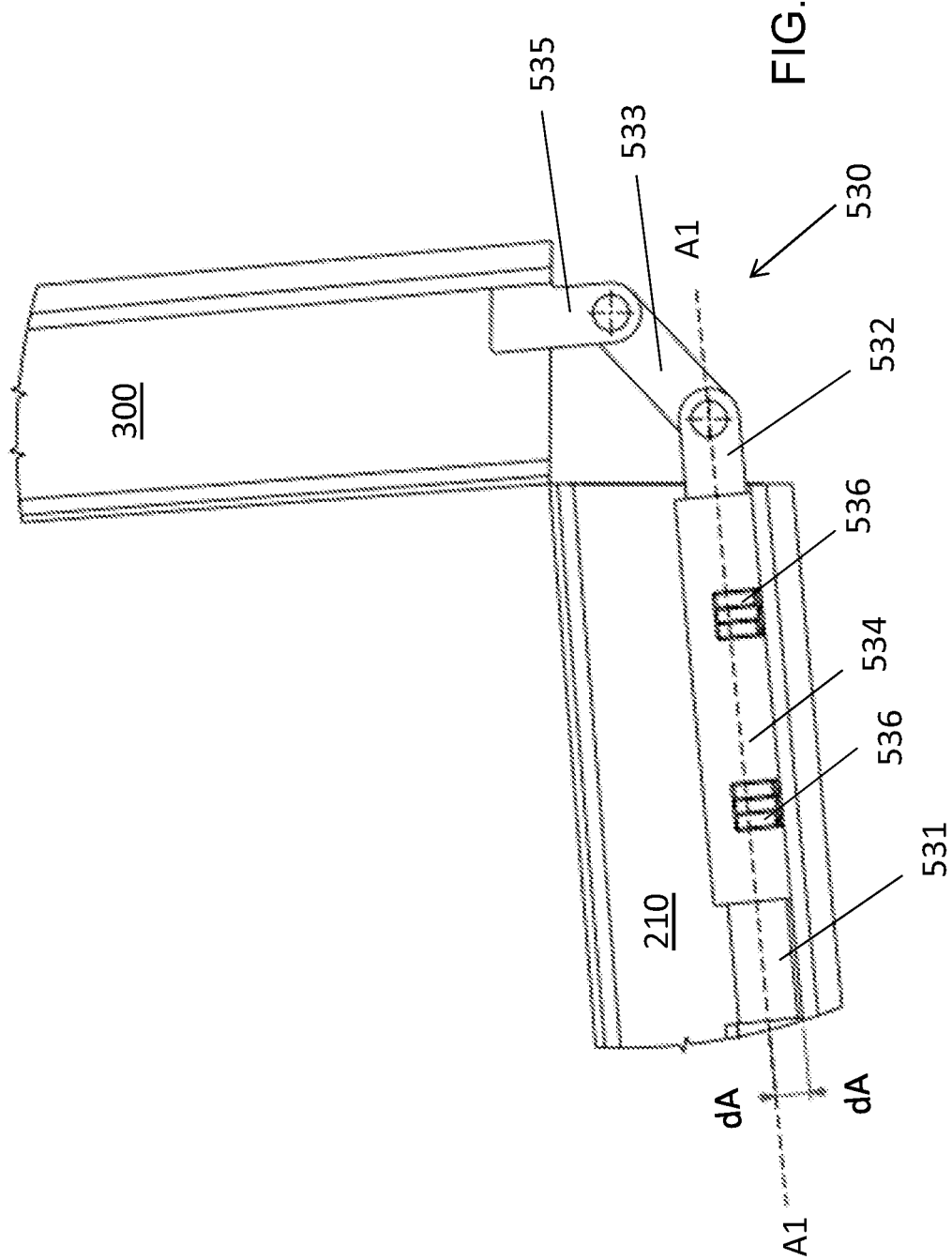
FIG. 4 is a rear view showing parts of the wing assembly along a section V-V (see FIG. 5)
Figure 5:
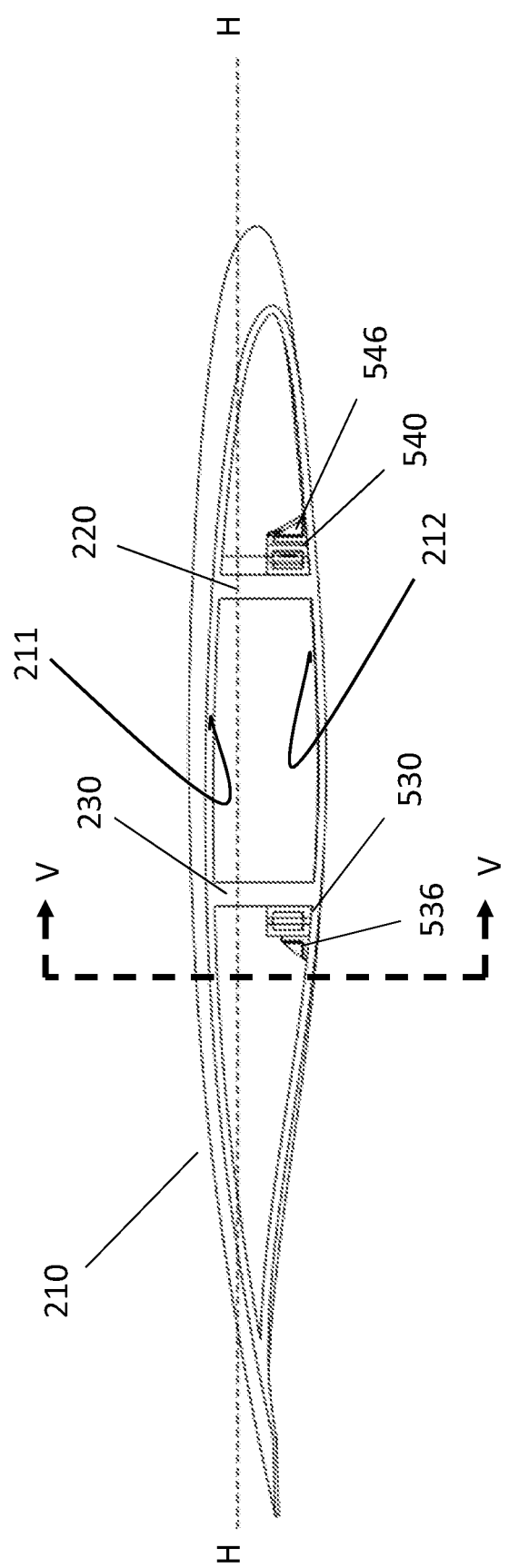
FIG. 5 is a view from an outboard end showing parts of the wing.
Figure 6:
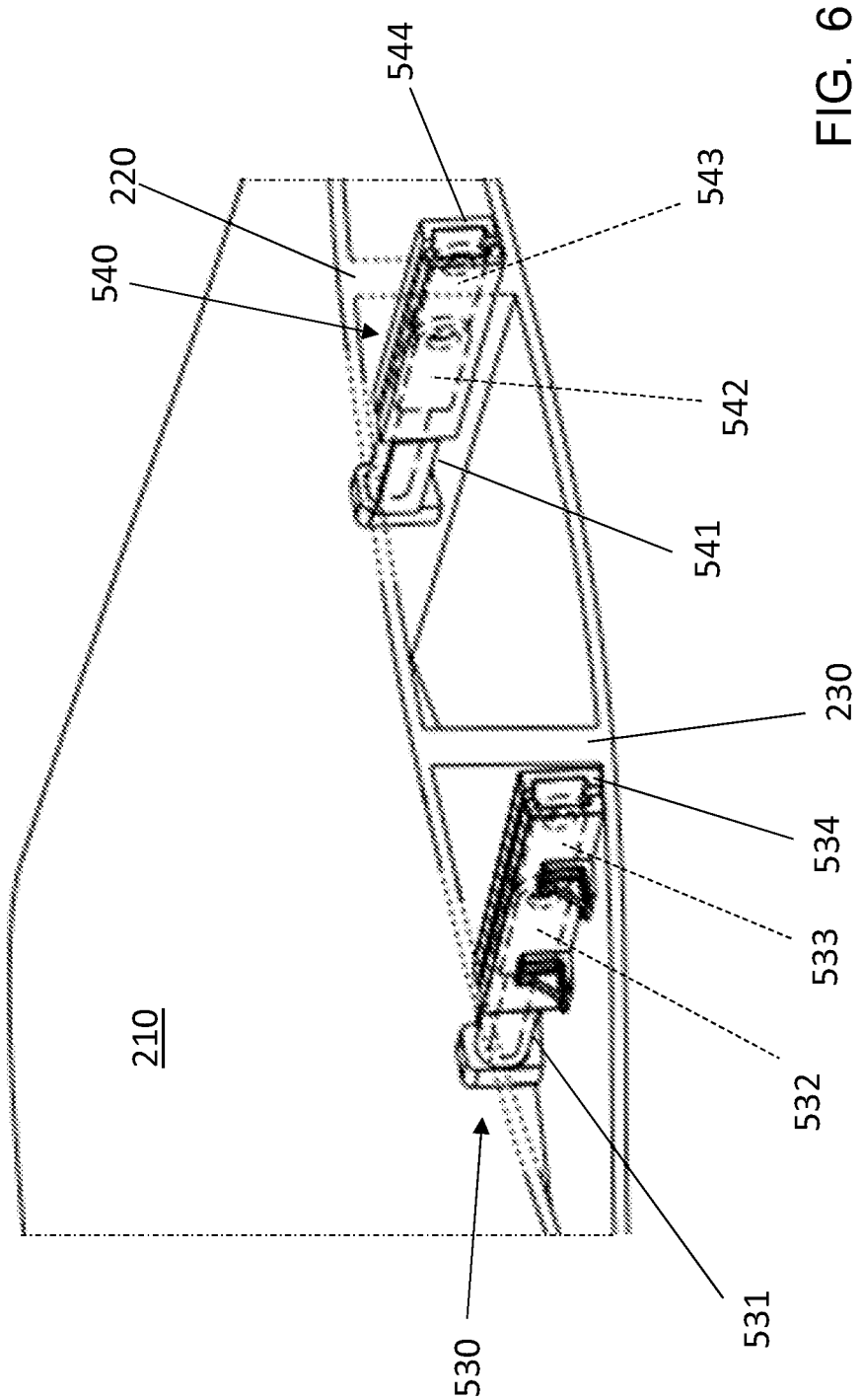
FIG. 6 is a perspective view from the rear of the outboard end showing parts of the wing, including details of an actuator assembly.
Figure 7:
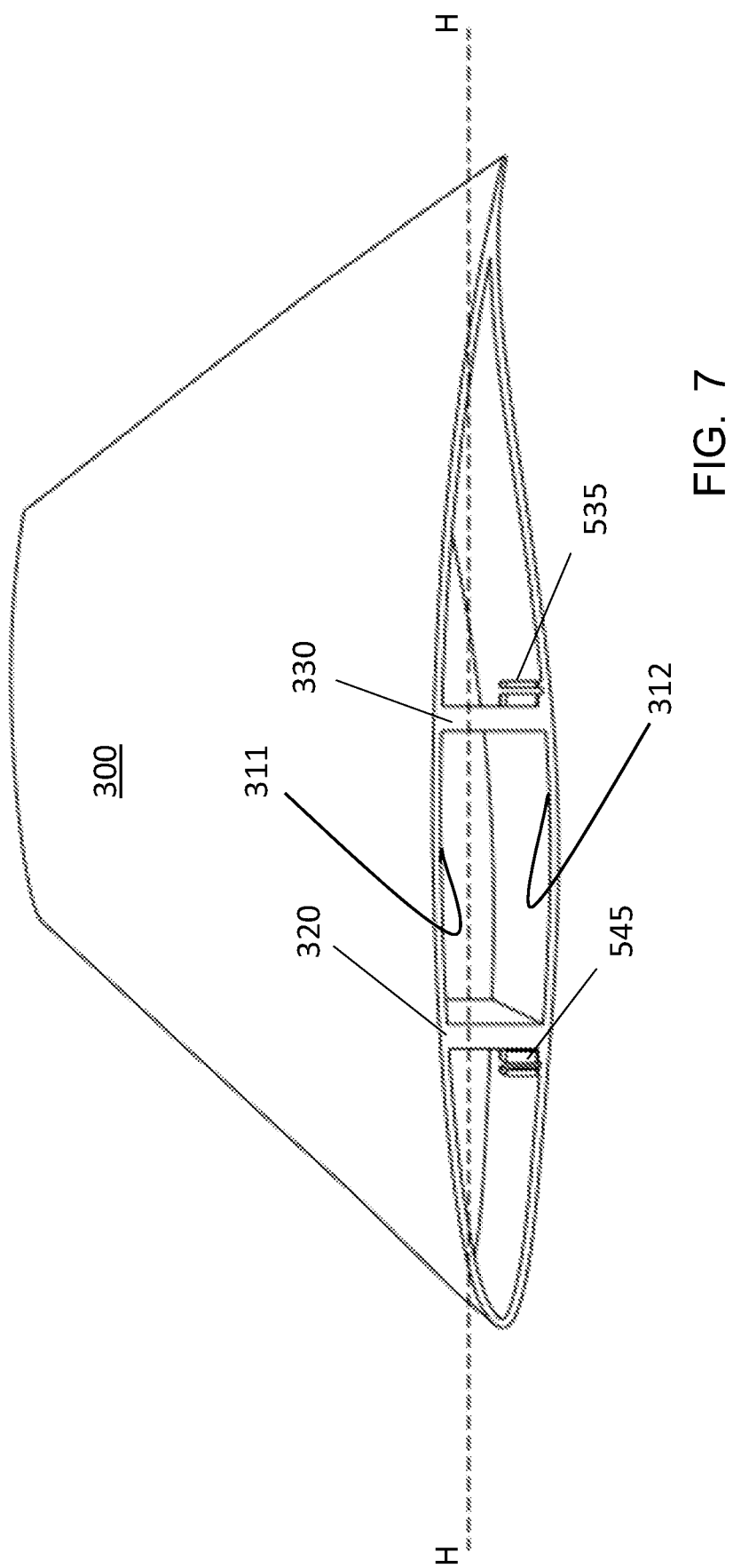
FIG. 7 is a view from an inboard end showing parts of the wing tip device.

Each linear actuation device 530, 540 includes, for example, a respective cylinder or base portion 531, 541, piston or driven portion 532, 542 movable relative to the base portion 531, 541, and connection portion 533, 543 pivotably connected at one end to the driven portion 532, 542 and at an opposite end to a respective pivot mount 535, 545 of the wing tip device 300, and a guide arrangement 534, 544 for guiding and supporting movement of the pivotable connection portion 533, 543 during actuation. Each longitudinal axis A1, A2 lies along a central axis of the drive portion 531, 541. The distance dA of the axes A1, A2 vertically above the lower covers 212 is shown in FIG. 4.

In various embodiments, the base portion 531, 541 of at least one of the actuation devices 530, 540 is mounted within the wing 210. For example, both base portions 531, 541 shown in FIGS. 1 to 8, including the guide arrangements 534, 544, are mounted within the wing 210, outboard end portions of the connection portions 533, 543 being pivotably connected to the pivot mounts 535, 545 of the wing tip device 300, and inboard end portions of the connection portions 533, 543 being pivotably connected to outboard end portions of the driven portions 532, 542. The base portions 531, 541 and/or guide arrangements 534, 544 are mounted in fixed relation to a respective wing spars 230, 220, so as to be structurally supported by the spars 230, 220, for distributing actuation loads through the spars 230, 220 and other load bearing structures of the wing assembly.

In alternative embodiments, at least one of the actuation devices 530, 540 may have its base portion 531, 541 and guide arrangement 534, 544 mounted in the wing tip device 300, an end portion of the connection portion 533, 543 of the or each actuation device 530, 540 being pivotably connected to a pivot mount of the wing 210.

In the embodiments described with reference to FIGS. 2, the longitudinal axes A1, A2 of the first and second linear actuation devices 540, 530 extend parallel to the axes of the converging wing spars 220, 230, and thus tend to converge relative to one another. In such embodiments, control systems and mechanisms may be provided to permit differences in travel and speed of actuation transverse to the hinge axis between the actuation devices 540, 530, and/or to allow for non-alignment of forces generated by the actuation devices 540, 530. For example, at least one actuation device 530, 540 may be provided with a spanwise extending additional axis of rotation between the driven portion 532, 542 and the connection portion 533, 543, for accommodating the non-alignment of the axes A1, A2.

In alternative embodiments, respective longitudinal axes A1', A2' of the first and second linear actuation devices 540, 530 extend parallel to one another, and transverse to the hinge axis H-H and/or junction J-J, as shown in Detail A of FIG. 10. In this case, an axis A1' of at least one of the actuation devices 530 is aligned out of parallel with a spar axis. In this case, a suitable mounting arrangement (not shown) may be provided to mount one of the actuation devices 530 at an angle to the spar 230 for support by the spar 230. This facilitates the provision of a simpler and potentially more cost effective and/or reliable actuation arrangement. For example, control systems and mechanisms do not need to accommodate the necessary differences in travel and speed transverse to the hinge axis between driven portions 532, 542 of the actuation devices 540, 530, or allow for the non-alignment of axial forces generated by the actuation devices 540, 530.

In further alternative embodiments, parallel spars may be provided, for example by using a non-tapered end portion of the wing 210, such end portion for example having substantially uniform width and depth, to support mutually parallel actuation devices 540, 530 having respective longitudinal axes A1', A2'. The actuators devices 530, 530 can then be conveniently and simply mounted in parallel with one another directly to faces of the mutually parallel spars.

Each actuation device 530, 540 comprises a respective guide arrangement 534, 544, for example in the form of C-section rails within which the driven portions 532, 542 and connection portions 533, 543 freely run, which rails may also receive and guide the mount portions 535, 545 of the wing tip device 300 in the flight configuration of the wing assembly 200. The guide arrangement in some alternative embodiments (not shown) may comprise one set of rails configured to guide movement of respective driven portions and/or connection portions of a grouped plurality of actuation devices, and more than one such grouped guide arrangement may be provided.

The actuation devices 530, 540 may comprise lock mechanisms (not shown). A lock may be applied, for example, in the ground configuration and/or the flight configuration as a safety measure. Additionally or alternatively, the actuation devices 530, 540 may include a damping or braking feature, for example to mitigate the effects of failure of one or more actuation devices 530, 540 with the wing tip device 300 raised in the ground configuration. The linear actuation devices 530, 540 may comprise, for example, a hydraulic actuator, an electric linear actuator, for example a ball screw actuator, a gas actuator or any other suitable type of actuator. Preferably, at least two respective power and/or control systems are provided to independently operate the respective at least two linear actuation devices 530, 540.

In some embodiments the wing assembly 200 has a hinge axis H-H extending in a region of upper covers 211, 311 of the wing assembly 200, and a plurality of linear actuation devices 530, 540 in a region of the lower covers 212, 312 of the wing assembly 200. A respective drive portion 531, 541 of one of the actuation devices 530, 540 may be mounted to a respective spanwise extending structural spar or beam 220, 320, 230, 330 either of the wing 210 or of the wing tip device 300, a respective second portion of such actuation device being pivotably connected to a respective pivot mount on either the wing tip device 300 or wing 210. Thus, at least one of the actuation devices 530, 540 may have its base portion 531, 541 and guide arrangement 534, 544 mounted in the wing tip device 300, an end portion of the connection portion 533, 543 of the or each actuation device 530, 540 being pivotably connected to a pivot mount of the wing 210.

The actuation devices 530, 540 may be disposed adjacent the lower covers 212, 312 of the wing assembly 200. For example, the actuation devices 530, 540 are disposed adjacent the lower covers 212, 312 of the wing 210 as shown in FIGS. 3 to 6. The longitudinal axes A1, A2 of the actuation devices 530, 540 may be disposed as closely as the operational envelopes of the devices 530, 540 allow to the inner surface of the lower covers 212, 312, or skin, forming the bottom inner surface of the wing 210 or wing tip device 300. In some embodiments, at least one recess or through opening (not shown) may be defined in the lower covers 212, 312 of the wing assembly 200, to permit movement of at least one of the linear actuation devices 530, 540 below an upper surface of the lower covers 212, 312 during actuation. The actuation devices 530, 540 in some embodiments are disposed closely adjacent respective bottom edge portions of respective spanwise spars 230, 220 or 330, 320 of the wing assembly 200. The actuation devices 540, 530 in some embodiments are mounted respectively to a bottom region of the front spar 220 and a bottom region of the rear spar 230 of the wing 210. The base portions 531, 541 and/or guide arrangements 534, 544 of the actuation devices 530, 540 may be supported by lower cover overhangs of the wing 210, and such support may include for example the use of fixings such as the brackets 536, 546.

Embodiments such as those described in the immediately preceding paragraph facilitate the provision of a reduced vertical distance dA of the axes A1, A2, A1', A2' from the lower covers 212, 312 and an increased vertical moment arm between i) the spanwise extending axes A1, A2, A1', A2' along which axial force is provided by the actuation devices 530, 540 and ii) the hinge axis H-H about which the wing tip device 300 is driven by the actuation devices 530, 540. This facilitates positioning of the actuation assembly 530, 540 to obtain improved mechanical advantage when actuating movement of the wing tip device 300. In some embodiments, this can facilitate the use of still smaller and/or lighter actuation devices 530, 540. Such arrangements of linear actuation devices can facilitate an increase in the aggregate power enabling actuation of longer and heavier wing tip devices whilst still accommodating the actuation devices within the wing assembly aerodynamic surface profile. Such embodiments also facilitate efficient, simple and reliable structural support of the actuation devices 530, 540.

The actuation devices 540, 530 in some embodiments are mounted outside of the wing box as shown in FIGS. 2 to 9, respectively forward of the first spar 220 and aft of the second spar 230, further reducing space constraints within the wing box. Mounting the actuation devices 540, 530 within the leading and trailing edge regions of the wing 210, outside of the wing box, facilitates the provision of relatively easy access to the actuation devices 540, 530, for example for maintenance purposes. Furthermore, an increase in free space within the wing 210 facilitates efficient placement within the wing of hydraulic and/or electrical and/or other system components required to pass from the wing 210 into the wing tip device 300, and/or the provision of fuel tanks of appropriate size and shape within the wing box. Freeing up space within the wing box also facilitates the provision of an increase in number and/or widthwise extent of hinges and/or latches, and facilitates improved placement and design of such components for efficient transfer of loads, as further described below.

Figure 8:
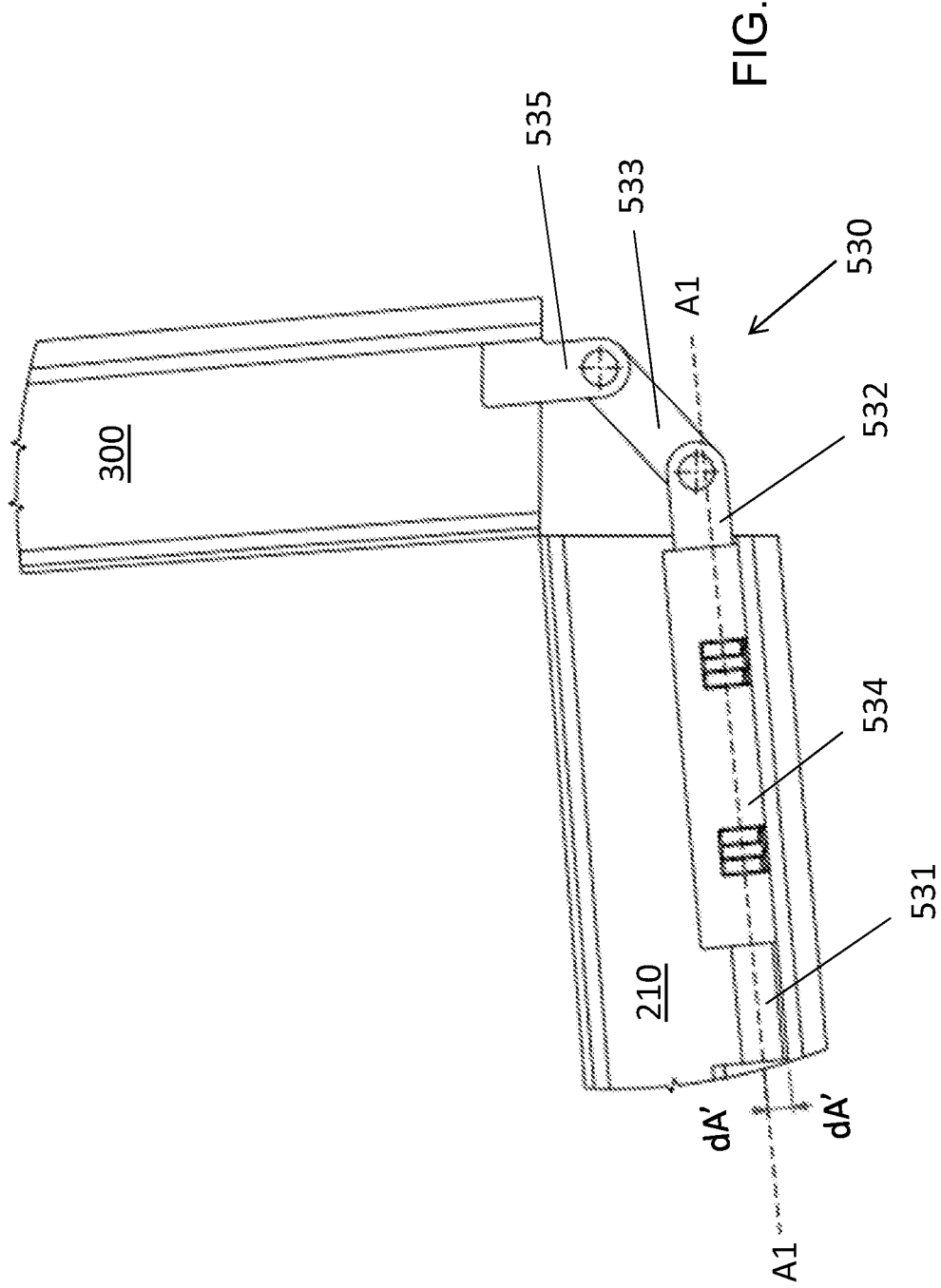
FIG. 8 is a rear view similar to FIG. 4, showing parts of an alternative wing assembly.

In some embodiments, additionally or alternatively, a plurality of the actuation devices 530, 540 is mounted in widthwise sequence, for example at widthwise intervals, between the front and rear wing spars 220, 230, in a region of the lower covers 211, 212 of the wing 210, for example spaced along the bottom of the wing box individually or in groups. Providing an increase in the number of actuation devices 530, 540 in this manner in the wing 210 or wing tip device 300 facilitates a further reduction in the depth or diameter of the actuators of the actuation devices necessary to drive a given wing tip device 300. This is illustrated in FIG. 8, where the consequential reduced vertical distance of the axis A1 from the lower covers 212, 312 is shown as dA'. This facilitates a further increase in the vertical moment arm between the axes A1, A2, A1', A2' and the hinge axis H-H.

Figure 9:
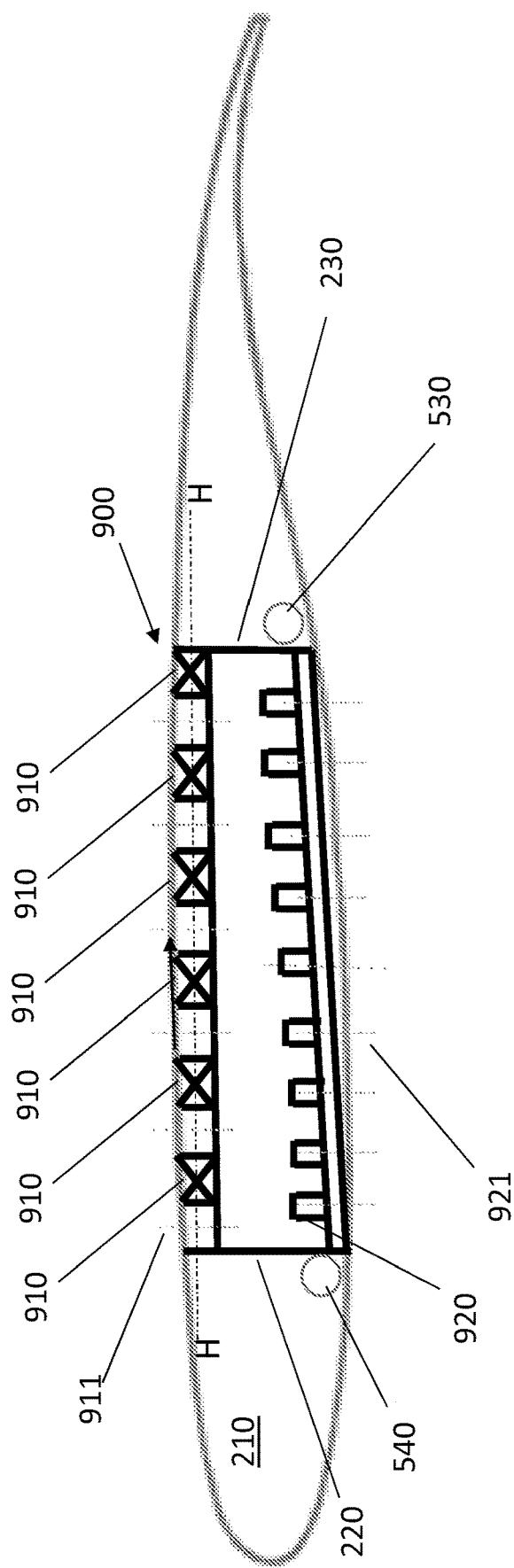
FIG. 9 is a view from an outboard end of a left hand variant of the wing assembly of FIGS. 2 to 8, showing parts of a hinge arrangement and a latching arrangement for the wing assembly.

FIG. 9 shows a left hand variant wing 210a of the wing 210 of the wing assembly 200. Elements of the wing 210a that have the same function as corresponding features described herein with reference to FIGS. 2 to 8 and 10 are shown in FIG. 9 using the same references numbers. Elements of wing 210a newly described below should be understood as applicable to the right hand wing 210 of FIGS. 2 to 8 and 10, mutatis mutandis. The wing 210a comprises a hinge arrangement 900 extending between the front spar 220 and the rear spar 230. The hinge arrangement 900 comprises a sequence of hinges 910 interspersed with upper latches (not shown) each latch comprising a wing latch lug, a wing tip device latch lug and a respective latch pin. The positions of respective latching axes 911 are indicated by broken lines in FIG. 9. In the flight configuration, latch lugs of the wing 210a and respective latch lugs of an accompanying wing tip device (not shown) engage one another with respective through openings in alignment. The latch pins are operable to move along the latching axes 911 through the aligned openings of the latch lugs of the wing and wing tip device, into and out of the latched condition.

The wing 210a also comprises lower latches (not shown) comprising lower latch lugs and respective lower latch pin mechanisms 920. The positions of respective lower latching axes 921 are indicated by broken lines in FIG. 9. In the flight configuration, lower latch lugs of the wing 210a and respective lower latch lugs of the accompanying wing tip device (not shown) interengage with respective through openings in alignment, lower latch pins of the latch pin mechanisms 920 being operable to move along the lower latch axes 921 through the aligned openings to latch and unlatch the wing tip device.

The hinge arrangement 900 extends substantially uninterrupted by other internal components of the wing 210a, for example by any part of the actuation assembly, between the front and rear spars 220, 230. In some embodiments, the lower latches extend substantially uninterrupted by other internal components of the wing 210a, for example by any part of the actuation assembly, between the front and rear spars 220, 230. The lower latches are disposed in a region of the lower covers of the wing assembly, to provide a large vertical moment arm relative to the upper latches and the hinge arrangement. This facilitates the efficient transfer of loads, and the use of smaller and/or lighter latch arrangements. In some embodiments, the lower latches may be respectively interspersed between at least some of the actuation devices widthwise along the lower covers 212, 312 of the wing 210, 210a and or wing tip device 300. In another embodiment (not shown) the actuation devices themselves may be used to hold the wing tip device in position, such that they obviate or reduce the need for lower latches. For example a series of actuation devices may be provided along the lower covers of the wing and/or wing tip device, these actuation devices may be arranged to hold the wing tip device in the flight configuration. Such an arrangement is enabled by virtue of the fact that the actuation devices can be relatively small, and thus a series of them may fit in this space within the wing.

The hinge arrangement 900 is disposed in a region of the upper covers of the wing assembly. This facilitates the provision of an increased vertical moment arm between the spanwise extending axes A1, A2, A1', A2' along which axial force is provided by the actuation devices 530, 540 and the hinge axis H-H.

It will be apparent from the above that at least some embodiments facilitate the provision of longer movable wing tip devices and/or longer span wing assemblies, especially when used with high aspect ratio wings with low thickness to chord ratios and shallow wing boxes, which can result in wing assemblies with reduced overall drag, and aircraft with increased fuel efficiency, reduced emissions and/or reduced operating costs. Such arrangements may facilitate the mitigation or overcoming of potential problems in providing a movable wing tip device while providing suitable supporting structure for transferring flight loads across the interface of the wing and wing tip device. Such arrangements may also facilitate the use of smaller and/or lighter actuators, and favourable positioning of the actuation assembly in order to obtain mechanical advantage when applying force to the wing tip device, facilitating still further actuator size and/or weight reduction.

At least some embodiments of the wing assembly 300, 400 are particularly advantageous when applied to a high aspect ratio long span wing assembly for a large passenger or freight aircraft. In at least some embodiments, the spanwise extent of the wing tip device 300 comprises more than 20%, more than 30%, or more than 35% or more than 40% of the spanwise extent of the wing assembly 200.

Whilst the present invention has been described and illustrated with reference to particular embodiments, it will be appreciated by those of ordinary skill in the art that the invention lends itself to many different variations not specifically illustrated herein. By way of example the wing tip device need not necessarily be of the shape shown in the drawings but could be of many other shapes. In some alternative embodiments, the junction between the wing and wing tip device may, instead of extending transverse to the spanwise direction, extend in another direction, for example along a chordwise direction of the wing assembly. Such arrangements may be generally aerodynamically favourable, for example presenting a smoother surface to airflow during flight and being easier to seal against migration of air between lower and upper surfaces of the wing during flight.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

The invention claimed is:

1. A wing assembly for an aircraft, the wing assembly comprising a wing, a movable wing tip device at the tip of the wing, and an actuation assembly configured to move the wing tip device between:
   i. a flight configuration for use during flight, in which the wing tip device projects from the wing for increasing the span of the aircraft, and
   ii. a ground configuration for use during ground-based manoeuvres, in which ground configuration the wing tip device is moved away from the flight configuration for reducing the span of the aircraft,
   the actuation assembly comprising at least two linear actuation devices mounted within the wing assembly to drivably connect the wing and the wing tip device for moving the wing tip device relative to the wing, the actuation devices being disposed adjacent respective bottom edge portions of respective front and rear spars of the wing assembly;
   the wing assembly further comprising a hinge arrangement disposed in a region of the upper covers of the wing assembly and extending between the respective front spar and the rear spar; and,
   wherein the wing tip device comprises at least two pivot mounts disposed in spaced relation widthwise of the wing tip device adjacent respective bottom edge portions of respective spars of the wing tip device,
   wherein each pivot mount is configured to pivotably connect to a respective linear actuation device of a wing adjacent respective bottom edge portion of the respective spar for driving relative movement between the wing tip device and the wing.

2. A wing assembly according to claim 1, wherein each actuation device has a longitudinal axis extending spanwise of the wing assembly, the longitudinal axes of the actuation devices being disposed in spaced relation in a widthwise direction of the wing assembly.

3. A wing assembly according to claim 1, wherein the wing is connected by the hinge arrangement to the movable wing tip device, and the actuation assembly is configured to move the wing tip device relative to the wing about an axis of the hinge arrangement, each actuation device having a longitudinal axis that extends transversely of the hinge axis, the longitudinal axes of the actuation devices being disposed in spaced relation in a direction of the hinge axis.

4. A wing assembly according to claim 1, wherein the actuation devices are disposed adjacent lower covers of the wing assembly.

5. A wing assembly according to claim 1, wherein the hinge arrangement comprises a sequence of hinges interspersed with upper latches.

6. A wing assembly according to claim 1, wherein the hinge arrangement extends substantially uninterrupted between the front spar and the rear spar.

7. A wing assembly according to claim 1, wherein at least one of the actuation devices comprises a base portion mounted within the wing, a driven portion movable relative to the base portion, and a connection portion, an outer end portion of the connection portion being pivotably connected to a pivot mount of the movable wing tip device.

8. A wing assembly according to claim 7, wherein the connection portion is pivotably connected to the driven portion.

9. A wing assembly according to claim 1, wherein a base portion of at least one of the actuation devices is mounted in a spanwise direction of the first spar or the second spar of the wing assembly so as to be structurally supported by said spars.

10. A wing assembly according to claim 1, at least one said actuation device being mounted aft of the rear spar of the wing, and/or at least one said actuation device being mounted forward of the front spar of the wing.

11. A wing assembly according to claim 1, wherein the longitudinal axes of the actuation devices are mutually substantially parallel.

12. A wing for a wing assembly according to claim 1, the wing being configured to mount at least two linear actuation device base portions disposed in spaced relation widthwise of the wing adjacent respective bottom edge portions of respective spars of the wing for pivotably driving relative movement between the wing tip device and the wing.

13. An aircraft comprising a wing assembly according to claim 1.

14. A large passenger or cargo aircraft according to claim 13.

15. A wing assembly for an aircraft, the wing assembly comprising a wing, a movable wing tip device at the tip of the wing, and an actuation assembly configured to move the wing tip device between:
   i. a flight configuration for use during flight, in which the wing tip device projects from the wing for increasing the span of the aircraft, and
   ii. a ground configuration for use during ground-based manoeuvres, in which ground configuration the wing tip device is moved away from the flight configuration for reducing the span of the aircraft,
   the actuation assembly comprising at least two linear actuation devices mounted within the wing assembly to drivably connect the wing and the wing tip device for moving the wing tip device relative to the wing, the actuation devices being disposed adjacent respective bottom edge portions of respective front and rear spars of the wing assembly;
   the wing assembly further comprising a hinge arrangement disposed in a region of the upper covers of the wing assembly and extending between the respective front spar and the rear spar; and
   wherein each of the at least two linear actuation devices comprises:
      a base portion mounted within the wing,
      a driven portion movable relative to the base portion,
      a connection portion, and
      wherein an outer end portion of the connection portion being pivotably connected to a pivot mount adjacent respective bottom edge portion of the movable wing tip device.

* * * * *